United States Patent [19]

Melgaard et al.

[11] 3,872,473

[45] Mar. 18, 1975

[54] MONITORING APPARATUS

[75] Inventors: Hans Melgaard, Minneapolis; Nile E. Plapp, Bloomington, both of Minn.

[73] Assignee: Despatch Industries, Inc., Minneapolis, Minn.

[22] Filed: Oct. 23, 1973

[21] Appl. No.: 408,722

[52] U.S. Cl. .......... 340/415, 340/412

[51] Int. Cl. .......... G08b 19/00

[58] Field of Search .......... 340/256, 415, 412; 250/211; 324/123; 317/137

[56] References Cited

UNITED STATES PATENTS

| | | | |
|---|---|---|---|
| 3,147,464 | 9/1964 | Spielman | 340/415 |
| 3,293,513 | 12/1966 | Biard et al. | 250/211 |
| 3,527,987 | 9/1970 | Havlioek | 340/415 |
| 3,688,294 | 8/1972 | Erpelding | 340/415 |
| 3,696,364 | 10/1972 | Lavelle | 340/256 |

OTHER PUBLICATIONS

IBM Technical Disclosure Bulletin, Vol. 15, No. 10, March 1973.

*Primary Examiner*—John W. Caldwell
*Assistant Examiner*—Richard Polange
*Attorney, Agent, or Firm*—Dorsey, Marquart, Windhorst, West and Halladay

[57] ABSTRACT

A system is provided for monitoring a series connection of a plurality of contacts across a voltage source, by responding as the contacts drop out to generate a binary coded display signal indicative of the initial contact to drop out. The system includes a detector connected in parallel across each contact to generate a detector output signal in response to the dropping out of its associated relay contact. A binary logic system, electrically isolated from the contacts and detectors, is responsive to the detector output signals to generate the binary coded display signal through binary logic. In the preferred embodiment, each detector includes a light emitting diode across a full wave rectifier, driveable to an excited state in response to the dropping out of its associated relay. The binary logic system contains photo transistors optically coupled to the light emitting diodes, and responsive to the light emitting diode output signals to produce binary output signals. The binary logic system further includes a logic-gating system for receiving the binary output signals and analyzing the binary signals through binary logic to produce a binary display signal indicative of which relay contact was the first to drop out.

8 Claims, 1 Drawing Figure

PATENTED MAR 18 1975 3,872,473
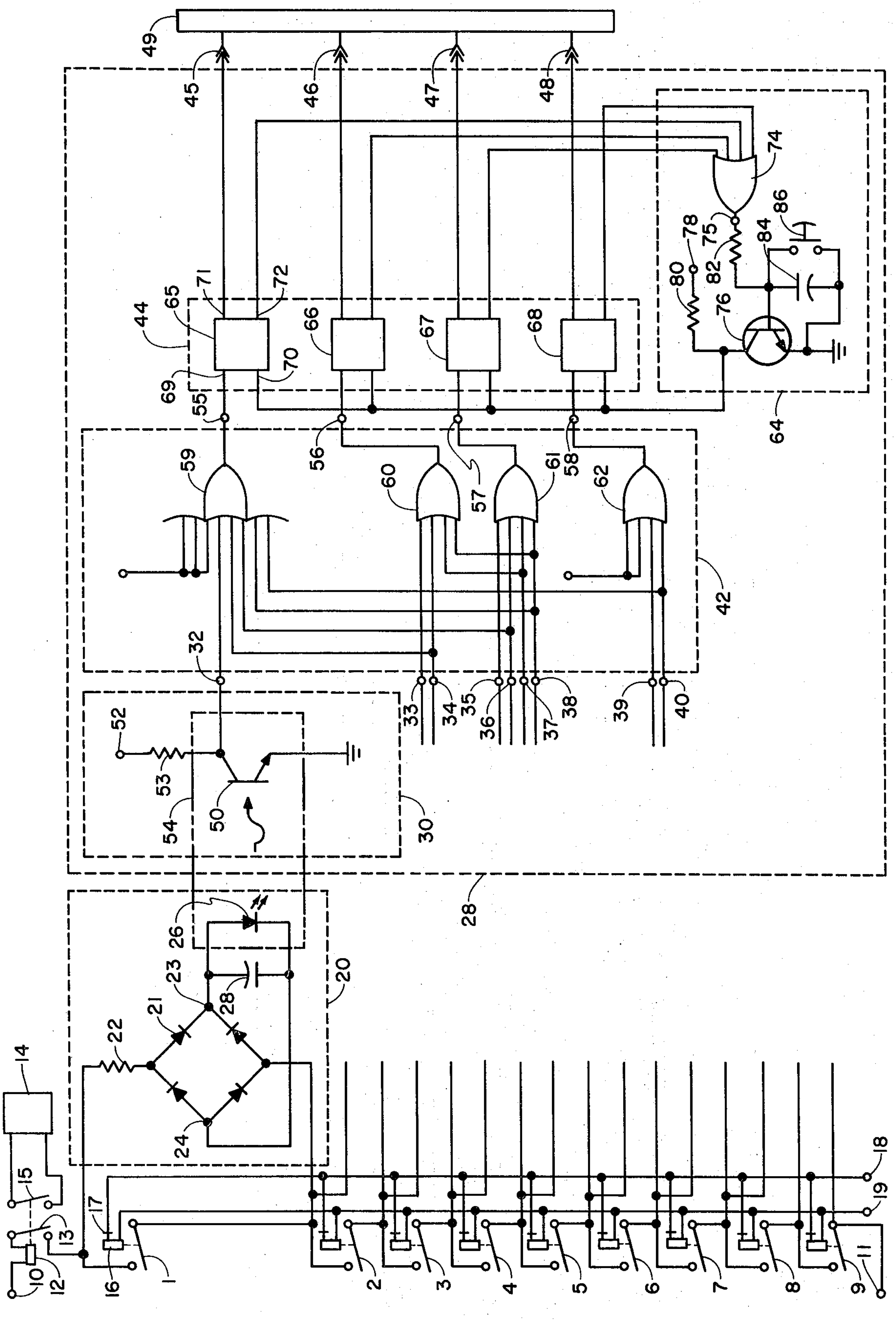

MONITORING APPARATUS

BACKGROUND OF THE INVENTION

Technology is replete with electrical or electrical mechanical devices utilizing a series connection of a plurality of relay contacts. Such circuits are common, for example, in systems containing a plurality of devices such as sensing switches which serve to control the overall system in response to certain conditions of the system. For example, such a system may contain a motor condition sensor, a safety switch, an air flow switch, and a temperature switch, each controlling a relay contact in the series connection of plurality of contacts. All contacts in the series must be closed before the overall system is totally activated. Once activated, the dropping out of any relay in response to the arising of a predetermined condition in the system causes the entire system to shut down, and further contacts to drop out. It is important in the case of such a shutdown to ascertain which of the contacts in the series was the first to drop out, since such knowledge aids in correction of the cause of a malfunction. Once several contacts have dropped, however, it is difficult to subsequently determine which contact was the first to drop. Some way of continuously monitoring and recording the contacts as they drop out is needed in order to ascertain which relay contact initially dropped out.

Some prior art devices have presented systems for indicating which contact was the first to drop in a series connection. For example, the Jones Patent, U.S. Pat. No. 3,611,364, issued Oct. 5, 1971, contains a plurality of thyristors connected in parallel across the ends of the series connection of contacts with the gate of each thyristor connected to one of the contacts being monitored. The first contact to drop out triggers the thyristors whose gates are connected to the contacts to one side of the dropped contact, energizing glow bulbs connected to the triggered thyristors. From the particular glow bulbs energized, it can be deduced which contact was the first to drop out. Another example of the prior art is illustrated in the Harte Patent, U.S. Pat. No. 3,619,768, where the dropping out of a contact similarly results in the activation of lights connected to contacts on one side of the dropped contact.

While prior art systems do indicate which contact was the first to drop, the known systems can do so only by total electrical inclusion into the device to be monitored, such as by each thyristor and glow bulb of the Jones U.S. Pat. No. 3,611,364 being placed in parallel across the entire series connection of relays. Furthermore, the prior art systems fail to utilize the efficiencies present in the use of a binary coded signal for indicating the initial contact to drop, including the adaptability to monitor systems with varied numbers of contacts, as well as the direct and efficient indication of the initial contact to drop.

BRIEF SUMMARY OF THE INVENTION

The present invention provides a monitoring system for determining which relay contact is the first to drop out of a circuit having a plurality of relay contacts connected in series across a voltage source. The system includes a plurality of detectors, with a detector associated with and connected in parallel across each relay contact. Each detector responds to the dropping out of its associated relay contact by producing a detector output signal to be received by binary logic means electrically isolated from the relay contacts. The binary logic means responds to the detector output by producing a binary-coded display signal indicative of which relay contact was the first to drop out.

In the preferred embodiment, the detector includes a light emitting diode to produce the detector output signal in the form of a light beam. The binary logic means includes photo transistors electrically isolated from and optically coupled to each light emitting diode to respond to the dectector output light beams by producing binary output signals. The binary logic means further includes a logic-gating system for receiving the binary output signals and analyzing them through binary logic to produce a binary-coded display signal indicative of which relay contact was the first to drop out. The display signal can be shown on a display board for direct visual display of which relay contact was the first to drop out.

The electrical isolation between the detectors and the binary logic means of the present invention reduces the overall effect of the monitoring system on the series contact circuit. The parallel connection of the detectors across the contacts further reduces effect on the contact circuit, while providing for ease of insertion of the monitoring system into the series contact circuit. The binary logic means provides a direct binary-coded signal indicating which contact was the first to drop, which signal can be displayed for a direct and efficient visual indication of the information.

BRIEF DESCRIPTION OF THE DRAWING

The FIGURE is a schematic diagram of the preferred embodiment of the monitoring apparatus, with only one complete detector and receiver shown by way of illustration.

DETAILED DESCRIPTION OF THE INVENTION

The invention moniters a plurality of relay contacts connected in series across a voltage source. In the FIGURE, a series connection of nine sensor relay contacts 1, 2, 3, 4, 5, 6, 7, 8, and 9 is illustrated in the preferred embodiment. Each sensor contact is responsive to a specific condition in an electrical-mechanical assembly, such as the state of a motor, the condition of a safety switch or a temperature switch, or the like. While nine sensor contacts are illustrated, any plurality of contacts can be monitored and the number shown in the FIGURE is illustrative only.

The sensor contacts 1 – 9 are in a series connection across a 110 volt Alternating Current power source, not illustrated, connected across terminals 10 and 11 with a main relay 12 and a main relay contact 13 in series in the line. Main relay 12 controls the circuit powering the electrical-mechanical assembly generally indicated at 14 by controlling a main relay contact 15 in series with the electrical-mechanical assembly 14. In operation of the electrical-mechanical system 14, after the system has been started and is running properly, main relay contacts 13 and 15 are held up by main relay 12. Each sensor contact 1 – 9 is held up by its own relay as shown in the FIGURE, such as sensor relay 16 which holds up contact 1. Each sensor relay, such as 16, is connected in series with a condition sensor, such as sensor 17 in series with relay 16. Each series connection of a sensor relay and condition sensor is connected in parallel across an independent power source applied across terminals 18 and 19. Each condition sensor, such as sensor 17, is responsive to a specific condition of the electrical-mechanical assembly 14 to disconnect the sensor relay and associated sensor contact under certain conditions of the assembly 14. Under an example of sensor 17 responding to the temperature of a portion of the electrical-mechanical assembly, an excessive temperature will result in the sensor 17 breaking its series connection with the relay 16, causing the relay 16 to be deactivated and to release its associated contact 1. Under the embodiment shown in the FIGURE, the dropping out of contact 1 causes the main relay 12 to be deactivated, dropping main contacts 13 and 15 and shutting down the assembly 14. As the assembly 14 shuts down, some of the other condition sensors may be triggered as the conditions within the assembly 14 change during shut down, and their associated contacts 2 – 9 may also drop out at some subsequent point in time.

As seen illustratively in the FIGURE, a plurality of detectors, such as detector 20, are associated with and connected in parallel across each sensor contact, for sensing the dropping out of the contacts and for producing output signals in response thereto. In the preferred embodiment, a single detector is connected in parallel across each contact. The example shown in the FIGURE has detector 20 connected in parallel across contact 1. It is understood from the FIGURE that each other contact 2 – 9 has a similar detector connected in parallel across it in the same manner as illustrated by detector 20.

Each detector senses the dropping out of its associated contact and produces a detector output signal, the preferred embodiment detector producing an output signal in the form of a light beam. Specifically, each detector, such as detector 20, has a full wave rectifier 21 in series with a lockout resistor 22, the combination in parallel across the associated relay contact such as 1. The rectifier 21 converts the AC signal originating from the power source across terminals 10 and 11 to a DC signal across its output contacts 23 and 24. A light emitting device, specifically a light emitting diode (LED) 26, is connected across the output contacts 23 and 24 of the full wave rectifier, with a capacitor 28 in parallel with the LED 26 to protect against activation by spurious short-time spikes.

As an operational example with contact 1 the first to fall out, the disconnection of sensor contact 1 increases the AC current through the full wave rectifier 21. The DC current across the output contacts 23 and 24 becomes sufficient to activate the LED 26 and the detector output signal in the form of a light beam is produced in response to the dropping out of the associated relay 1. The lockout resistor 22 is a relatively large resistor serving to limit the current through the LED 26, and to decrease the current through the main relay 12, insuring the relay's deactivation after the dropping out of sensor contact 1. Without the lockout resistor 22, the main relay 12 might not be deactivated if the impedance of the detector 20 were insufficient to adequately decrease the current through relay 12. The actual parameters of the resistor 22 are dependent upon the other parameters of the system; in the preferred embodiment with a 110 volt AC power source, a 33 kiloohm resistance for resistor 22 is adequate.

Binary logic means 28 is electrically isolated from the contacts and detectors for receiving the detector output signals from the detectors and for responding to the detector output signals by producing a binary display signal indicative of which sensor contact was the first to drop out. The binary logic means 28 has a plurality of receivers, at least one of which receivers is coupled to each detector. The receivers are responsive to the output signal of at least the detector associated with the first sensor contact to drop out, with each responding receiver producing a binary output signal in response thereto.

In the FIGURE, one receiver 30 is shown for purposes of illustration. This receiver 30 is coupled to the detector 20 monitoring contact 1 and is connected to terminal 32 leading to the remainder of the binary logic means 28. In the preferred embodiment of the FIGURE, a single receiver is coupled to each detector. Specifically, a receiver identical to receiver 30 is coupled to the detector for contact 2 and is connected to terminal 33, and so forth, down to the receiver coupled to the detector for contact 9 and connected to terminal 40. Each receiver responding to a detector output signal from its associated detector produces a binary output signal which appears at its terminal, 32 – 40.

The terminals 32 – 40 are connected to a logic-gating system for receiving the binary output signals and analyzing the binary signals through binary logic to produce a display signal indicative of which relay contact was the first to disconnect. The binary logic system contains a plurality of logic gates 42 for receiving the step-level binary output signals at the terminals 32 – 40 from the receivers, and converting the binary output signals through binary logic to binary coded display signals. The logic-gating system further contains a plurality of latches 44 connected to the logic-gates 42 for receiving the binary coded display signals and passing only the first display signal received in time as the display signal of the first sensor contact to drop out. The binary display signal is finally generated onto output terminals 45, 46, 47, and 48, in the form of a binary coded signal. This display signal may be displayed on a display board 49 of conventional design to visually indicate which relay contact was the first to drop out.

As a more specific description of the operation of the binary logic means 28, each receiver, such as receiver 30, contains a photo receiving device electrically isolated from and optically coupled to one detector. The preferred embodiment uses a photo transistor 50 powered by a conventional positive voltage source connected at terminal 52 through a conventional load resistor 53. This photo transistor 50 is electrically isolated from and optically coupled to the LED 26, so that a detector output signal from the LED 26 in the form of a light beam activates the photo transistor 50 from a nonconducting "off" state to a saturated "on" state. In its "off" state, the photo transistor 50 exhibits a binary output signal at terminal 32 of the same level of positive voltage inserted at terminal 52. In its "on" state, the photo transistor goes into saturation and exhibits a binary output signal at terminal 32 of a substantially zero voltage. Under standard terminology, the binary output signal of the "off" transistor is "up," that is of a positive value, with the output signal of the "on" transistor "down," of a substantially zero value. The LED 26 and photo transistor 50 can take several forms and combinations, with the preferred embodiment using a conventional unitary optical switch illustrated at 54.

In operation, when the contact 1 is closed, the LED 26 of the detector 20 produces no detector output, and the binary output signal of the associated receiver 30 produces an "up" binary output signal at terminal 32. When the contact 1 drops out, the LED 26 produces a detector output signal in the form of a light beam, which activates the photo transistor 50 in the receiver 30, producing a "down" binary output signal at terminal 32.

The logic-gates 42 receive the binary output signals from the receivers at terminals 32 – 40 and produce a binary coded display signal at terminals 55 – 58. The term "binary coded display signal" follows the conventional terminology referring to increasing powers of two, where for example, an "up" signal at terminal 55 indicates two to the zero power, or one; an "up" signal at terminal 56 indicates two to the first power; an "up" signal at terminal 57 indicates two to the second power, and so forth. An "up" signal at all the terminals 55 – 58 indicates that contact 9 has dropped out. Or, to use the example specifically illustrated in the FIGURE, an "up" signal at terminal 55 only, indicates that contact 1 has dropped out.

The binary logic of converting the receiver output binary signals to a binary coded display signal is accomplished by the logic-gates 42. In the preferred embodiment of the FIGURE, each logic-gate 59 – 62 is a NAND gate. Each gate has a multiplicity of inputs derived from the receiver signals present at terminals 32 – 40, and reflects a change in the state of any of the inputs by changing the state of its output. In the normal case where all contacts 1 – 9 are closed and all inputs to the NAND gates are up, all gates have a down output to terminals 55 – 58. When any input to a NAND gate drops, the gate reverses its output to an up output. Under this logic, only certain gates change their output in order to indicate which relay dropped out. For example, if contact 5 drops out, its associated detector and receiver cause the signal at terminal 36 to drop, which signal appears only at gates 59 and 61 as a down signal change causing the signals at 55 and 57 to rise indicating in binary that contact 5 has dropped.

The plurality of latches 44 receive the binary coded display signals from the gates 59 – 62 and pass only the first display signal to be received in time. This is accomplished by means of a lock-out circuit 64 which is triggered by the first display signal to be received in time, and causes the latches to thereafter shut down and block further display signals. Specifically, four latches, 65 – 68 are present, with a single latch connected to a single gate. With particular reference to latch 65 by way of example, one input 69 receives the display signal from a gate 59. The other input 70 receives the lockout signal from the lockout circuit 64. One output 71 transmits the received display signal in its original state to terminal 45. The other output 72 transmits the received display signal in its reversed state to the lock-out circuit 64. Prior to the receipt of the first binary display signal, input 69 is down, input 70 is up, output 71 is down, and output 72 is up. Assuming in this example that the first binary display signal contains an up signal for the digit corresponding to this latch 65, just after the receipt of the first binary display signal and prior to the operation of the latch-out circuit 64, input 69 is up indicating the up digit, input 70 is still up, output 71 is up indicating the up display digit, and output 72 is down, indicating that a display signal digit has been received. This change of state of output 72 is fed to the lock-out circuit 64, activating the circuit 64 with some time delay.

The lock-out circuit 64 is activated by the first display signal and locks the latches 65 – 68 against transmitting any further display signals generated by subsequent relay contacts to drop out. Specifically, the lock-out circuit 64 contains a NAND gate 74 activated by a change in state of any of its inputs. Latch output 72 and comparable outputs of the other latches 66 – 68 are connected to the inputs of the NAND gate 74. Using the above example, if the output at 72 changes state due to receipt of a display signal, that change state triggers the NAND gate to change state so that the signal at terminal 75 would be changed from its normally down state to an up state. The remainder of the lock-out circuit 64 contains a transistor 76 normally turned off and feeding an up signal to the latches 65 – 68, such as to terminal 70 of latch 65. The transistor 76 is powered by a conventional power source connected at terminal 78 through load resistor 80. An RC circuit serves to turn the transistor on at the appropriate time, the RC circuit being conventional and formed of a resistor 82 and a capacitor 84. When the output at 75 changes from a down to an up state, the up signal turns the transistor 76 on after the RC circuit delay as determined by resistor 82 and capacitor 84 in a conventional manner. When the transistor 76 turns on, the signal fed to the latches 65 – 68 drops down. The dropping of the input signal to the latches, such as at input 70 of latch 65, causes the latch to turn off against passing any further signals received from the logic gates. A reset switch 86 is placed in parallel across the capacitor 84 to reset the system when desired, by closing the switch 86 which shorts out the capacitor 84 and turns off the transistor 76 to change the inputs such as 70 to their normally up state, resetting the latches.

In overall operation of the system, the first sensor contact to drop out in contacts 1 – 9 is the first to trigger its associated detector by activating its LED, such as LED 26 in detector 20. Activation of the LED activates the receiver associated with the detector such as receiver 30 associated with detector 20. The activated receiver produces a binary output bit at the associated terminal 32 – 40. The binary output bit is fed into a plurality of logic gates 59 – 62 which produce a binary display signal indicative of the contact first to drop out. The binary coded display signal passes through a plurality of latches 65 – 68 and is presented at terminals 45 – 48, where the signal can be displayed on a display board 49. The first binary coded display signal to pass through the latches 65 – 68 also triggers a lock-out circuit 64, preventing any subsequent display signals from passing through the latches to the display board.

After the first sensor contact 1 – 9 has dropped out, other contacts may also drop out as the assembly 14 shuts down. In the preferred embodiment illustrated in the FIGURE, the sensor relays such as relay 16 are mechanical relays. Such mechanical relays have an inherent time delay of disconnection of at least one-half a cycle of the AC power source present across terminals 18 and 19, resulting in a minimum inherent time delay between the disconnection of the first sensor contacts 1 – 9, and the disconnection of the second and subsequent contacts 1 – 9. This minimum of one-half cycle delay is reflected in the RC delay present in the lock-out circuit 64 where the RC delay is approximately that of a one-half cycle duration, or about 8 milliseconds for a 60 cycle power source across terminals 18 and 19. This 8 millisecond delay before the lock-out circuit 64 locks the latches 65 – 68 affords sufficient time for the NAND gates 59 – 62 and the latches 65 – 68 to process the binary signals of the first contact 1 – 9 to drop out, and insures against transmittal of signals from subsequent contacts. Other types of relays might be used exhibiting varied time delay characteristic In such cases, the RC delay in the lock-out circuit must be adjusted to reflect those relay characteristics, and the delays inherent in the NAND gates 59 – 62 and the latches 65 – 68 must be matched to the relay delays to insure proper operation of the system.

The system as illustrated monitors nine sensor contacts 1 – 9. Under the principles of the invention, the system can be modified to monitor any number of relays. For example, the same system illustrated with four logic gates 59 – 62 can be readily modified to monitor up to 16 relay contacts since a four-bit binary number can produce sixteen different numberical indications. Addition of a fifth logic gate, such as gates 59 – 62, would increase the system capacity to monitoring 32 contacts. Alternatively, the binary display signal can be formed into binary coded decimal where one system such as illustrated would be used for processing each digit of ten into a binary indication of the decimal digit.

While the illustrated preferred embodiment shows a particular configuration of sensor contacts 1 – 9 to be monitored, the system is capable of monitoring a variety of series contact circuits. Other modifications of the invention will be evident to skilled persons in this art, and the above discussion should not limit the scope of this invention.

I claim:

1. A monitoring system for determining which relay contact is the first to drop out of a circuit having a plurality of relay contacts connected in series across a voltage source, the system comprising:

a plurality of detectors for sensing the dropping out of the relay contacts and for producing output signals in response thereto, with a separate detector associated with and connected in parallel across each relay contact, each detector producing an optical detector output signal in response to the dropping out of its associated relay in response to the dropping out of its associated relay contact; and binary logic means electrically isolated from the relay contacts and detectors, and having photo receiving devices for receiving the optical detector output signals from the detectors through an optical connection and for responding to the detector output signals by producing a binary display signal indicative of which relay contact was the first to drop out.

2. The monitoring system of claim 1 wherein each detector comprises:

a full wave rectifier connected in parallel across the associated relay contact and having output contacts, the rectifier producing a direct current signal at its output contacts upon the dropping out of the associated relay contact; and a light emitting diode connected across the output contacts of the full wave rectifier and driveable by the direct current signal of the full wave rectifier to produce the detector output signal in the form of a light beam.

3. The monitoring system of claim 1 wherein each detector has a light emitting diode driveable to an excited state in response to the dropping out of its associated relay contact, for producing the detector output signal; and the binary logic means includes a photo transistor electrically isolated from and optically coupled to each light emitting diode, responsive to the detector output signals.

4. The monitoring system of claim 1 wherein:

the binary logic means has a plurality of receivers, at least one of which receivers is coupled to each detector; the receivers are responsive to the output signal of at least the detector associated with the first relay contact to drop out, with each responding receiving producing a binary output signal in response thereto; and the binary logic means includes a logic-gating system for receiving the binary output signals and analyzing the binary output signals through binary logic to produce a binary-coded display signal indicative of which relay contact was the first to drop out.

5. The monitoring system of claim 1 wherein:

each detector is associated with and connected in parallel across only one of the relay contacts; and each detector has a photo emitting device driveable to an excited state in response to the dropping out of its associated relay contact, for producing the detector output signal; and the binary logic means has a plurality of receivers, each of which receivers contains a photo receiving device electrically isolated from and optically coupled to one detector for responding to the output signal of the coupled detector by producing a binary output signal in response thereto.

6. The monitoring system of claim 5 wherein the binary logic means has a logic-gating system for receiving the binary output signals and analyzing the binary signals through binary logic to produce a display signal indicative of which relay contact was the first to disconnect.

7. The monitoring system of claim 6 wherein the logic-gating system comprises:

a plurality of logic gates connected to the receivers for receiving the step-level binary output signals from the receivers and converting the binary output signals through binary logic to binary coded display signals; and a plurality of latches connected to the logic gates for receiving the binary coded display signals and passing only the first display signal received in time as the display signal of the first relay contact to drop out.

8. The monitoring system of claim 7 including a display board for displaying the binary coded display signal of the first relay contact to drop out.

* * * * *